April 17, 1928.
F. HODGKINSON
1,666,495
EXPANSIBLE PIPE JOINT
Filed Dec. 27, 1924
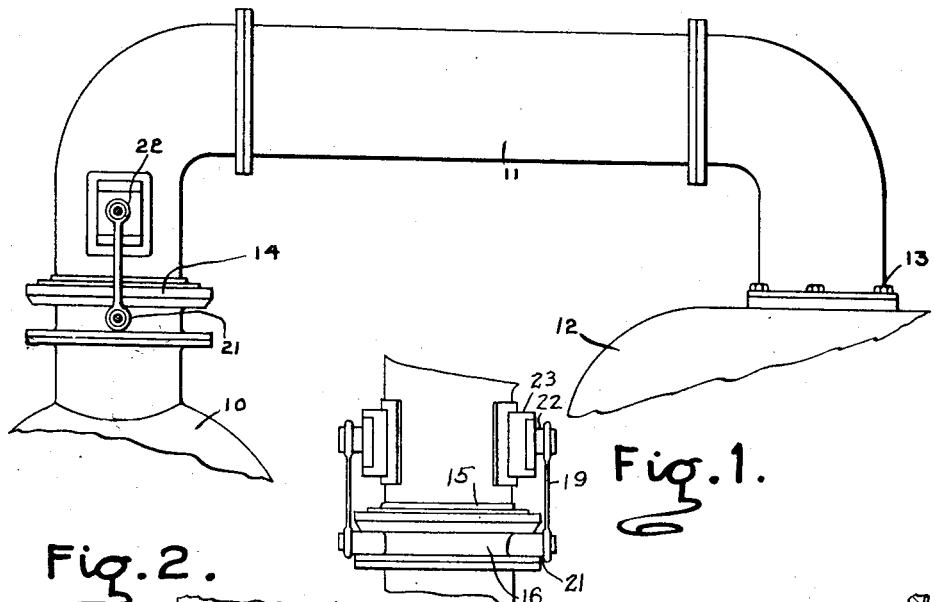
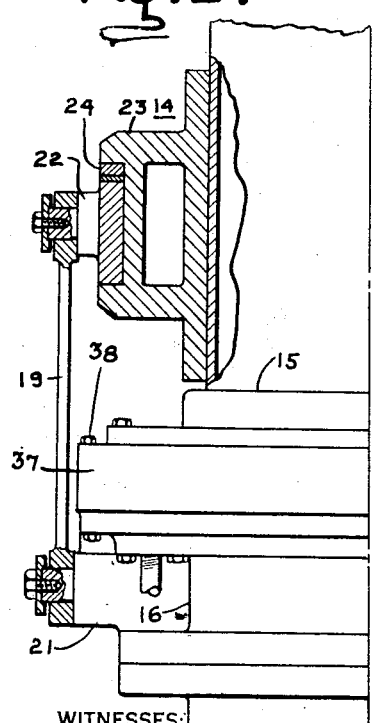
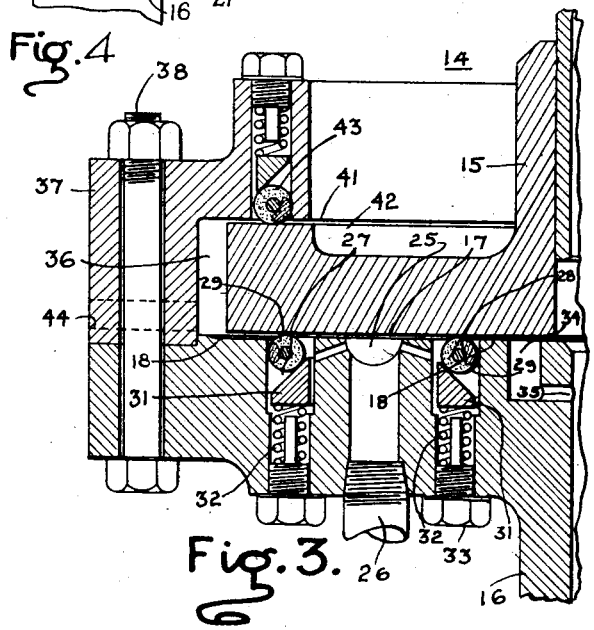
F. Hodgkinson
INVENTOR
BY *D. C. Davis*
ATTORNEY Patented Apr. 17, 1928.

1,666,495

UNITED STATES PATENT OFFICE.

FRANCIS HODGKINSON, OF SWARTHMORE, PENNSYLVANIA, ASSIGNOR TO WESTINGHOUSE ELECTRIC & MANUFACTURING COMPANY, A CORPORATION OF PENNSYLVANIA.

EXPANSIBLE-PIPE JOINT.

Application filed December 27, 1924. Serial No. 758,405.

My invention relates to couplings, particularly to couplings for connecting the adjacent ends of expansible conduits and it has for an object to provide apparatus of the character designated which shall provide a fluid-tight connecting means between adjacent sections of conduit and which shall be capable of withstanding a fluid pressure equal to that of the conduit. It has for a further object to provide a coupling which shall permit of relative expansive movements of the coupled sections without offering any substantial resistance to such movements.

These and other objects, which will be made apparent throughout the further description of my invention, are set forth in the following specification and illustrated in the accompanying drawing, in which Fig. 1 is an arrangement of a cross-compound turbine in which one form of my novel coupling is employed in the receiver piping connecting the high pressure and the low pressure elements; Fig. 2 is an enlarged view, partly in section and partly in elevation, of a portion of the coupling employed in Fig. 1; Fig. 3 is a partial view, in sectional elevation, taken radially through the connecting joint of the coupling and Fig. 4 is a fragmentary end elevation at right angles to Fig. 1.

In the installation of power plant machinery, such as steam turbines, condensers, pumps, etc., it is necessary to provide suitable conduits or pipes for conveying motive and exhaust fluid to and from the various machines and, inasmuch as the expansive movements of the respective machines differ in extent and direction, it becomes necessary to so arrange the piping that the expansive movements of one machine are not influenced by those of another. In addition, the piping itself is subject to expansion and the thrust resulting therefrom must not be imparted to the machines. It has been customary heretofore to so form the various pipes that they flex sufficiently to absorb their own as well as the expansive movements of the connected machines. However, such an arrangement requires that substantial bends be provided in the piping, which arrangement is not always possible because of lack of available installation space. Under such conditions it becomes necessary to arrange the piping without regard to flexibility and to provide for expansion by installing an expansible bellows or telescoping slip joint of one of the well-known types, which usually employs asbestos, hemp or some other suitable packing material.

The employment of an expansible bellows in piping having a substantial diameter, for example, 70 inches, is not advisable because of its resistance to deflection and the possibility of its ultimate failure as a result of frequent flexing. Furthermore, the unbalanced forces due either to internal or external pressure may become of such magnitude as to cause a total failure. Telescoping slip joints of the larger diameters, employing any of the well-known packing materials enumerated above, must of necessity offer considerable frictional resistance to expansion in order that they may maintain a fluid-tight joint.

I have devised a form of coupling or expansion joint for piping which is fluid tight and which absorbs the relative expansive movements of the connected piping without offering any substantial resistance thereto whatsoever. I accomplish these results by providing a pair of flanges in closely spaced relation and having disposed therebetween a liquid seal in which a pressure in excess of that prevailing in the conduit is maintained. The sealing liquid is confined within desired limits by two packing members which are approximately liquid tight. The flanges are arranged for freedom of movement, the one across the other so that expansion is cared for by a shearing movement in the joint. A coupling so constructed possesses many advantages inasmuch as the packing members are not compelled to provide an absolutely fluid-tight joint, as some leakage of the sealing liquid does not in any way affect the ability of the water seal to entirely prevent leakage of air or steam. Furthermore, the total resistance to expansive movement which is offered by a liquid seal and the required packing members, which members need be only substantially liquid tight, is almost negligible.

Couplings or expansion joints of the type herein disclosed are especially adapted for use in the receiver piping of cross-compound turbines, in which it is very advisable that the expansive movements of the respective turbine elements be not influenced or interfered with and that the connecting piping be so arranged as to set up no strains whatsoever in the turbine structure. Such piping frequently conveys steam or vapor having a sub-atmospheric pressure, and it is therefore necessary that the expansion joint connecting the receiver pipe sections be capable of preventing the infiltration of air into the turbine system. Couplings, such as herein disclosed, have been found to give especially good results when operating under these exacting conditions.

Referring to the drawing for a more detailed description of my invention, I show in Fig. 1, a cross-compound turbine consisting of a high pressure element 10 exhausting through a receiver pipe 11 to a low pressure element 12. The receiver pipe 11 is rigidly connected to the low pressure element 12 as by a plurality of bolts 13 in a manner well known in the art. Interposed between the receiver pipe 11 and the high pressure element 10 is a coupling or expansion joint 14 constructed in accordance with my invention.

As shown in Figs. 2 and 3, the coupling 14 comprises a pair of flange members 15 and 16, which are adapted to be connected to adjacent pipe sections. The flange members 15 and 16 are provided respectively with faces 17 and 18, which are arranged in closely spaced parallel relation. To maintain this closely spaced relation, the adjacent pipe sections are connected by links 19. The lower ends of the links are secured to the lower pipe section as by pivoting on bosses 21—21 on the flange member 16, and the upper ends to pivot members 22—22 on the upper pipe section above the flange 15. These links will prevent movement of the adjacent pipe sections in an axial direction and thereby maintain the faces 17 and 18 in a fixed closely spaced relation. However, lateral movement, that is, movement in a plane which is parallel to faces 17 and 18 and which is normal to the axes of joint 14 and of the connection of conduit 11 and element 12, is permitted through movement of the pivots at the ends of links 19. The pivot members 22 have suitably formed base portions secured in suitable guide-ways 23, provided on the pipe section to which the flange member 15 is secured. Interposed between each guide-way and pivot member are suitable adjusting wedges 24, by means of which the distance intervening between the parallel faces of the flange members may be adjusted. Thus the links 19 are so connected to the adjacent pipe sections that they support the upper portion of the coupling together with the connecting piping without in any way interfering with the freedom of relative lateral movement of the flange members, the one over the other.

Provided in the parallel face 18 of the flange member 16 is a circular sealing groove 25 having an inlet connection 26 for the admission of sealing liquid. Disposed on opposite sides of the sealing groove 25 are packing members 27 and 28 for confining the sealing liquid within desired limits. Each of the packing members 27 and 28 is composed of some suitable packing material 29, such as lead wire wrapped with foil and graphite or hemp, against which bears a metallic ring 31 of triangular cross section. The packing rings 29 and the metallic rings 31 are supported upon springs 32, the compressive strength of which may be altered by suitable adjustments of screws 33. As constructed, the packing rings 29 may be inserted in their respective grooves and the pressure applied after the joint is assembled.

Sealing liquid which may escape by the packing member 28 collects in a circular drainage groove 34 which has provided at some desirable point in its periphery an outlet 35 for draining the sealing liquid to the interior of the conduit.

Sealing liquid which may escape by the packing member 27 accumulates in a collection chamber 36 which is formed by the face 18 of the flange member, the outer rim of the flange member 15 and a third member 37 which is rigidly secured to the flange member 16 as by a plurality of bolts 38. The member 37 is provided with a circular face 41 which is arranged in closely spaced relation with a cooperating face 42 provided on the flange member 15. Provided in the member 37 is a packing member 43 which may be similar in construction to the packing members 27 and 28, heretofore described, and which forms a fluid-tight closure for the collection chamber 36. A suitable outlet connection 44 is provided in the member 37 for removing sealing liquid which may accumulate in the collection chamber.

The operation of the above embodiment of my invention is as follows: Assuming the high pressure element 10 to be exhausting to the low pressure element 12, the extent of the expansive movements of the respective elements may vary considerably. As the available installation space above the turbine may require that the receiver pipe 11 be formed, for example, as illustrated in Fig. 1. it is necessary that some means, such as the coupling herein disclosed, be provided between the receiver pipe 11 and one of the turbine elements for freely permitting expansive movements of the conduit and incidentally freedom of relative movement of the turbine elements.

In the operation of my coupling, sealing liquid, preferably condensate, is conveyed to the sealing groove 25 and is maintained therein at a pressure slightly in excess of the maximum likely to prevail within the receiver pipe. In turbine installations, this pressure is frequently sub-atmospheric and it is therefore necessary to prevent the infiltration of air into the turbine system. I would therefore prefer to maintain a sealing liquid pressure of, for example, 17 to 18 pounds absolute, thereby providing a continuous seal through which the air cannot obtain ingress to the turbine system. Should any of the sealing liquid escape through the packing members 27 and 28, it is drained off through the respective outlets 35 or 44. The packing members 27, 28 and 43, being of circular cross section, offer only slight sliding resistance to relative lateral movement of the flange members. It is to be understood that the present invention is not limited to the particular form of packing illustrated, but that it may be of various forms such as rectangular or of any form of packing, as the only requirement is that it be of an elastic character and capable of making a fluid-tight joint by means of the rings 31 and springs 32 between the wall of the groove and the face of the opposing flange. It is not necessary that these packing members be applied to the flange member 15 with sufficient pressure to ensure fluid tightness as some leakage of the liquid does not effect in any way the sealing efficiency of the joint. The links 19 prevent the flanges from making contact and hence their freedom of relative lateral movement is not interfered with, the only frictional resistance encountered being that created by the pivoting movement of the links about the crossheads 22 and by the sliding action of the packing members 27 and 28.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A coupling for adjacent conduit sections adapted to move laterally with respect to each other, comprising a pair of flanges secured to respective sections and arranged in closely spaced relation, two concentrically arranged packing members interposed between the flanges, and means for conveying sealing liquid to the chamber defined by the packing members and the flanges.

2. A coupling for adjacent conduit sections adapted to move laterally with respect to each other, comprising a pair of flanges disposed in closely spaced relation, three annular packing members interposed between the flanges, a sealing annulus provided between two of the packing members, means for conveying sealing liquid to said annulus, and a chamber positioned between the two remaining packing members for collecting sealing liquid leakage.

3. A coupling for adjacent conduit sections adapted to move laterally with respect to each other, comprising a pair of flanges disposed in closely spaced relation, one of said flanges having a recess provided therein, an annular packing member disposed on each side of the recess between the flanges, and means for conveying sealing liquid to said recess.

4. A coupling for adjacent conduit sections comprising a pair of flanges disposed in closely spaced relation, one of said flanges having a groove provided therein, means for conveying sealing liquid to the groove, inner and outer packing members disposed on opposite sides of the groove between the flanges, and a chamber for collecting sealing liquid which may escape the outer packing member.

5. A coupling for adjacent conduit sections adapted to move laterally with respect to each other, comprising a pair of flanges disposed in closely spaced relation, one of said flanges having a groove provided therein, means for conveying sealing liquid to the groove, inner and outer packing members disposed on opposite sides of the groove between the flanges, and separate chambers for collecting sealing liquid which may escape the respective packing members.

6. A coupling for adjacent conduit sections adapted to move laterally with respect to each other, comprising a pair of flanges disposed in closely spaced relation, one of said flanges having a groove provided therein, means for conveying sealing liquid to the groove, inner and outer packing members disposed on opposite sides of the groove between the flanges, separate chambers for collecting sealing liquids which may escape the respective packing members, and outlet means provided in said chambers.

7. A coupling for adjacent conduit sections comprising a pair of flanges secured to the respective sections and disposed in closely spaced relation, liquid sealing means interposed between the flanges for preventing the passage of fluid therebetween, and means for adjusting the distance intervening between the flanges.

8. A coupling for adjacent conduit sections comprising a pair of flanges secured to the respective sections and disposed in closely spaced relation, liquid sealing means interposed between the flanges for preventing leakage of fluid therebetween, and link members connecting the flanges for maintaining them in spaced relation.

9. A coupling for adjacent pipe sections comprising a pair of flanges secured to the respective sections and disposed in closely spaced relation, liquid sealing means interposed between the flanges for preventing leakage of fluid therebetween, and rigid link members pivotally secured to the respective pipe sections for maintaining them in spaced relation.

10. A coupling for adjacent pipe sections comprising a pair of flanges secured to the respective sections and disposed in closely spaced relation, liquid sealing means interposed between the flanges for preventing the leakage of fluid therebetween, link members pivotally secured to the respective pipe sections for maintaining them in spaced relation, and means associated with the link members for adjusting the distance intervening between the flanges.

11. A coupling for adjacent conduit sections comprising a pair of flanges secured to the respective sections and arranged in closely spaced relation, three annular packing members interposed between the flanges, means for maintaining sealing liquid between the first and second packing members, a chamber positioned between the second and third packing members for collecting sealing liquid leakage, liquid outlet means provided in the chamber, link members pivotally connecting the pipe sections for maintaining them in spaced relation, and means associated with said link members for adjusting the distance intervening between the flanges.

12. In combination with two motor devices, a conduit for conveying fluid therebetween, means for rigidly securing one end of the conduit to one of the motor devices, and a coupling for flexibly connecting the remaining end of the conduit to the second motor device, said coupling being adapted to permit relative movement between the conduit and the motor device in a direction parallel to a plane substantially normal to the axes of the connections of the conduit to the motor devices and including liquid sealing means for preventing leakage of fluid between the conduit and the second motor device.

13. The combination with two motor devices, of a conduit for connecting the motor devices for conveying fluid therebetween, two oppositely disposed flanges provided in the conduit, liquid sealing means interposed between the flanges for preventing the leakage of fluid therebetween, and link members for supporting one of the conduit sections, said link members permitting freedom of relative lateral movement of the flanges.

14. A disconnectible section for a conduit comprising flanges having adjacent plane surfaces, spaced means associated with the surfaces for restraining the leakage of fluid thereacross, means for passing a liquid between the flanges and between the spaced means, and means providing for a variable separation of the flanges within a predetermined limit.

In testimony whereof, I have hereunto subscribed my name this ninth day of December, 1924.

FRANCIS HODGKINSON.